(12) United States Patent
Crudele et al.

(10) Patent No.: US 9,122,730 B2
(45) Date of Patent: Sep. 1, 2015

(54) FREE-TEXT SEARCH FOR INTEGRATING MANAGEMENT OF APPLICATIONS

(71) Applicant: International Business Machines Corporation, Armonk, NY (US)

(72) Inventors: Michele Crudele, Rome (IT); Bernardo Pastorelli, Rome (IT); Randa Salem, Rome (IT)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 13/903,699

(22) Filed: May 28, 2013

(65) Prior Publication Data

US 2013/0325851 A1 Dec. 5, 2013

(30) Foreign Application Priority Data

May 30, 2012 (GB) .................................. 1209547.7

(51) Int. Cl.
*G06F 7/00* (2006.01)
*G06F 17/30* (2006.01)

(52) U.S. Cl.
CPC ...... *G06F 17/30554* (2013.01); *G06F 17/3005* (2013.01)

(58) Field of Classification Search
CPC ................................................ G06F 17/3005
See application file for complete search history.

(56) References Cited

U.S. PATENT DOCUMENTS

| | | |
|---|---|---|
| 7,376,642 B2 | 5/2008 | Nayak et al. |
| 7,483,978 B2 | 1/2009 | Esfahany et al. |
| 7,890,809 B2 | 2/2011 | Nye et al. |
| 7,930,381 B2 | 4/2011 | Attanasio et al. |
| 7,953,750 B1 | 5/2011 | Gupta |
| 2005/0060286 A1 | 3/2005 | Hansen et al. |
| 2007/0073686 A1* | 3/2007 | Brooks et al. ............ 707/6 |
| 2008/0271061 A1 | 10/2008 | Branson et al. |

* cited by examiner

*Primary Examiner* — Ajith Jacob
(74) *Attorney, Agent, or Firm* — Stephen R. Tkacs; Stephen J. Walder, Jr.; Jeffrey S. LaBaw

(57) ABSTRACT

An integration mechanism for managing computing components may be provided. It may comprise collecting management information about the computing components using a data collection component, storing objects of the collected management information in a full-text search-index data-structure, generating for each collected object a displayable result snippet, searching the full-text search-index data-structure for matching objects based on a received parameter, retrieving all matching objects of the full-text search-index data-structure related to the search, and displaying the matching objects in form of the related result snippets, wherein the integration mechanism is independent from the computing components it is collecting management information from.

20 Claims, 4 Drawing Sheets

FREE-TEXT SEARCH FOR INTEGRATING MANAGEMENT OF APPLICATIONS

BACKGROUND

The invention relates generally to integration for managing computing components. The invention relates further to mechanism for free-text search for integrating management of applications.

Today, hardware systems and software systems of any kind are typically managed using special tools, often called systems or services management tools. In this context, the term software system may comprise infrastructure applications as well as end user applications. Customers of system management tools often face the problem of managing their information technology (IT) infrastructure, which consists of hardware systems and software systems, through different systems or service management tools, or in applications integrated configuration and/or management tools. Most times, these tools cannot be integrated. Consequently, this means accessing information and a system management through different management systems that usually provide different user interfaces and user experiences by the different tools. This is one of the key reasons why users ask for integration between system management products to have a single point of access for their management infrastructure.

The traditional answer to the integration complaint is, for a system management vendor, to start developing integration logic inside of its product allowing them to work together. This operation is usually very time-consuming because it requires changing the products, and is also limited to the suite of products provided by each vendor. For this reason, this solution is not very effective in case a customer owns products from different vendors and, in the worst case, together with in-house grown management solutions.

This makes apparent the drawback of the traditional approach: it is quite expensive from a development point of view, and it does not offer an "open" solution that allows integrating products from different system management vendors.

There are several disclosures related to an integration method for managing computing components.

Document U.S. Pat. No. 7,890,809 B2 discloses a high level Operational Support System (OSS) framework providing the infrastructure and analytical system to enable all applications and systems to be managed dynamically at runtime regardless of platform or programming technology. Applications are automatically discovered and managed. Java™ applications have the additional advantage of auto-inspection (through reflection) to determine their manageability. Resources belonging to application instances are associated and managed with that application instance. This provides operators the ability to not only manage an application, but its distributed components as well. They are presented as belonging to a single application instance node that may be monitored, analyzed, and managed.

Document U.S. Pat. No. 7,483,978 B2 discloses, in certain embodiments, a method for providing a unified user interface for managing a plurality of heterogeneous computing environments comprising displaying at least a portion of a framework user interface, the framework user interface comprising common functionality and a standard layout for the unified user interface. A listing of a subset of the heterogeneous computing environments may be displayed. Each of the heterogeneous computing environments may be modeled by one or more objects, each object corresponding to a particular computing environment. The method further includes, in response to an interaction request with respect to a particular computing environment, applying an appropriate plug-in, based on a mapping of the object that corresponds to the particular computing environment to the appropriate plug-in to perform the requested interaction.

Thus, there may be a need to overcome limitations from known systems management tools regarding integration needs of users. More particularly, there may be a need to integrate management and configuration systems in a flexible way without predefined programmed integration logic.

SUMMARY

This need may be addressed by an integration method for managing computing components, an integration system, a computer system, a data processing program, and a computer program product, according to the independent claims.

According to one embodiment, an integration method for managing computing components may be provided. The integration method may comprise collecting management information about the computing components using a data collection component, storing objects of the collected management information in a full-text search-index data-structure, and generating for each collected object a displayable result snippet. The method may also comprise searching the full-text search-index data-structure for matching objects based on a received parameter, retrieving all matching objects of the full-text search-index data-structure related to the searching, and displaying the matching objects in form of the related result snippets. Thereby, the integration method may be performed independent—in particular, distinct—from the computing components it is collecting management information from.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

Embodiments of the invention will now be described, by way of example only, and with reference to the following drawings.

DETAILED DESCRIPTION OF THE SEVERAL VIEWS OF THE DRAWINGS

Figure 1:
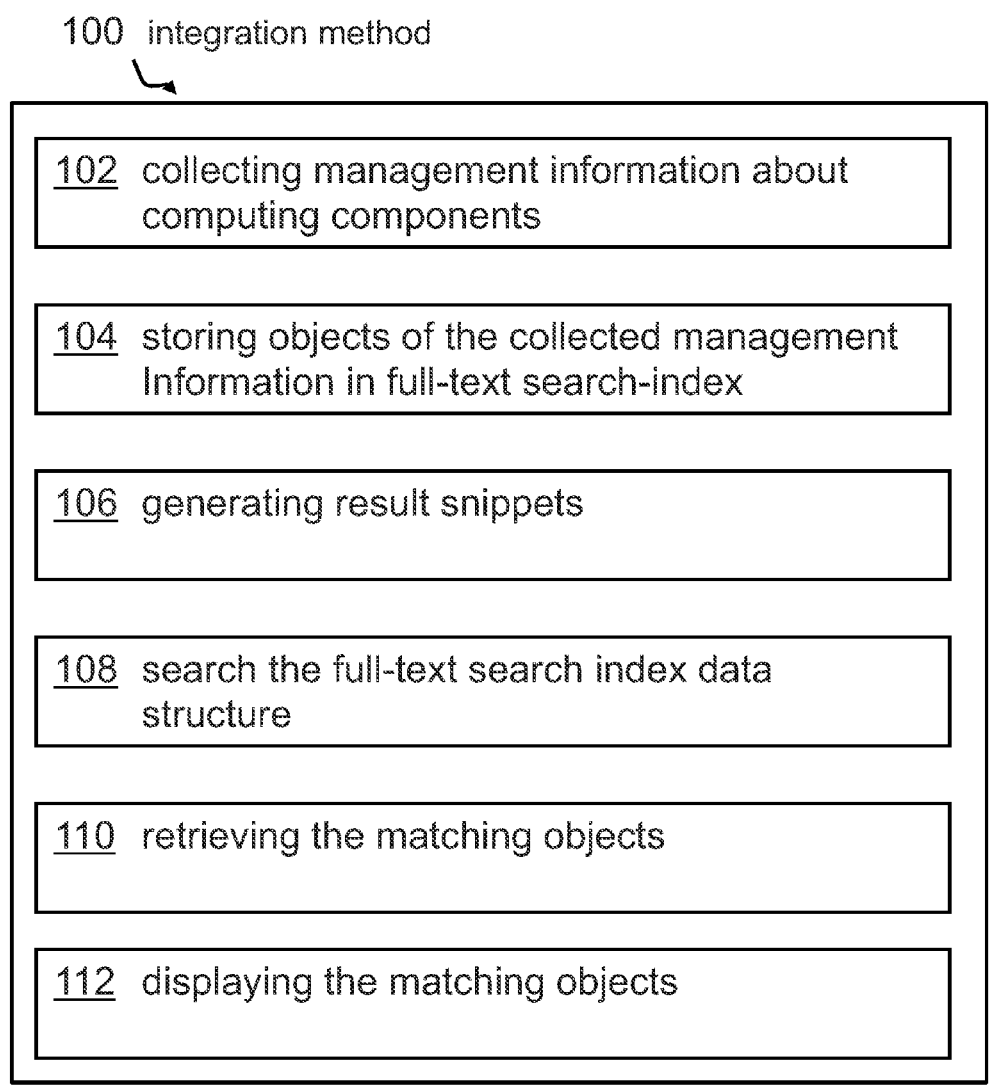
FIG. 1 shows a block diagram of integration management of applications in accordance with an illustrative embodiment.

It may be noted that the computing components may in particular be hardware and/or software components and there may be more than one full-text search-index data-structure to support the method. The received parameter may be an input from a user.

In the context of this application, the following conventions may be followed:

Computing component—The term computing component may denote any hardware or software element as part of a computing environment, which may be a traditional central computing center. Or, the computing components may be distributed over several locations. It may also be a cloud computing center. The computing components may comprise application programs, infrastructure software, software services, middleware, network hardware like routers, switches, etc., network management software, database systems, Web-Servers, operating systems, servers of any kind, end user devices, network nodes, cabling systems, cooling systems, appliances, facility components, security systems, and so on. Basically, it may comprise at least all elements that may be manageable by systems management software or that may comprise its own configuration tools.

Management information—The term management information may denote information about computing components and its ongoing operations and status. Typically, management information about computing components may be managed by systems management software. It may be stored in a specific systems management database. It may also comprise simpler configuration tools that may store their configuration information.

Data collection component—The term data collection component may denote a service that may typically be implemented in software. It may be a crawler that searches for system management information of computing components in a given environment. The crawler may use accelerated methods to collect the required information. However, it may be noted that the crawler may not reach out to the Internet but may stay in a defined computing environment, e.g., a data center.

Objects—The term objects may denote a piece of information about a computing component. This may be a status of an application or a device, like started or stopped, a configuration, information about activated part-components, access time, performance data, etc. Generally, all data being collectable using systems management tools may fall into the category of the term objects.

Full-text search-index data-structure—The term full-text search-index data-structure may denote a data-structure typically used by a search-engine to store information about information found during a proprietary search process by, e.g., a crawler.

Result snippet—The term result snippet may denote an alphanumeric string, typically also including a hyperlink or pointer to a computing component or a specific function that may be called, e.g., a user interface. The alphanumeric string may be related directly to the information found by the crawler or it may relate to a human readable and interpretable translation of such information. A result snippet may easily be inserted into a pre-configured HTML page (HTML=hypertext mark-up language). The result snippet may be stored as part of or outside the full-text search-index data-structure.

Matching object—The term matching object may denote an object as a result of a query against a storage containing the object. The query may define certain criteria. The matching objects fulfill the criteria.

Independent performance—The term independent performance or independent execution—in particular, in context of a performance of the method—may denote the circumstance that, e.g., the integration system that may perform the integration method may run and be executed without having any connection to the computing components from which the management information comes from. These systems may be up and running, may be stopped, or may have been taken off-line altogether. The integration system may execute its operation without being dependent on the systems it may have collected management information from.

Web-Service—The term Web-Service may denote a software component for a communication between two electronic devices or service using typical Internet protocols. It may be defined as a software system designed to support interoperable machine-to-machine interaction over a network. It may have an interface described in a computable format (specifically, Web-Services Description Language). Other systems interact with the Web-Service in a manner prescribed by its description using Simple Object Access Protocol (SOAP) messages, typically conveyed using Hypertext Transfer Protocol (HTTP) with an Extensible Markup Language (XML) serialization in conjunction with other Web-related standards (see also, http://en.wikipedia.org/wiki/Webservice#cite_note-0)

Tweaked—The term tweaked may denote an amendment or a change in a predefined manner. A search word may be tweaked in a certain manner to enhance the chance to find related objects. A translation table may be used for the tweaking.

Action—The term action—in particular in the context of displayed snippets—may denote a command to a hardware or software component, in general to a computing component. It may, e.g., be a call and start of a program or a function. It may also be a start of a virtual machine or a shutdown of a network connection. Generally, it may be everything that may typically be performed by a systems administrator or user of a computing center.

Launch—The term launch may denote starting and preparing for usage by e.g., a user. It may, e.g., be a user interface that may be launched for interaction or—as another example—a virtual machine.

The proposed integration method for managing computing components may offer a couple of advantages:

The integration method, as described above, may allow for accessing systems management and configuration information about computing components of a data center without using a dedicated systems management software tool. The related integration system is independent from a classical database having stored systems management information. Instead, the required information is using a full-text search-index data-structure and, thus, delivers full-text search capabilities that may be known to users of the integration system from search-engines. Thus, no new training efforts are required.

The integration system may not require a direct connection to the original source for management information for its operation. The information may have been collected before the usage. The integration system may be completely disconnected for its functioning. In this case, the search operations thereon will leverage the full-text search-index data-structure as an off-line source.

According to prior art, the integration system requires a direct connection between the search-engine and application database. The subject-matter of this disclosure does not require a direct connection to the original information source during a search operation. It performs a one-time connection to the original source in order to create an index on a different location, which from then on may be the target of query and search operations—also in a totally disconnected way from the original source. The query/search operations will leverage the full-text search-index data-structure in an off-line mode. By the integration system and method, there may not be any impact on performance of computing components. It may offload the central computing component database from search operations, moving the end users to the free text-search interface described in this document. Since the majority of the enterprise end users perform such search scenarios, this approach may provide a major advantage of performance offloading on systems running in a data center. Related solutions based on the inventive method and system may offer a high availability solution. The proposed approach may represent a highly available search environment since it may continue to function even if the original computing component may be off-line, e.g., in case of maintenance for the computing component and a related database. For example: a user may continue to search and create reports and analyze computing components in the data center.

The proposed usage of the full-text search-index data-structure
may require neither an extra database nor related storage cleanup procedures.

And, there is added capability, versus known technologies, by exposing some common management operations directly from a search interface. This may increase the usability of the integration system. A user may perform his or her common tasks directly from the search interface instead of having to login or switch to the corresponding native software application interface. If the searching may span several computing components a user is typically working with, this advance of a unique launch point is even more advantageous because the user's experience presented with these launch operations may hide potential complexity and the need to log to different systems or access web user interfaces of the various systems involved. Additionally, if a computing component, e.g., a backend system, may temporarily be unavailable, the user may continue to submit operations and the integration system will retry the operations until the system is back online. The operation may also be stored intermediately for later use. This may avoid disruption to the user and may allow him/her to continue with other search operations, reporting or to work on other online systems.

Furthermore, the inventive concept may also allow capabilities to cluster the search results based on user selectable attributes of the data collected from computing components. And, the user may view graphically and immediately how the query/search results may be distributed, based on his needs. This may also provide an advanced filtering technique.

And there are even more advantages: Known technology imposes a hard requirement on back end systems because it imposes a common data model in order to represent non-homogeneous management systems and be able to render them in the interfaces. The currently disclosed concept may be based on an approach which de-couples the data model of the computing components from the rendering model and may not pose any requirements on the computing components it provides the search service for. It may be attached seamlessly to any application or system and may leverage the technique of customizable HTML snippets to model the displaying.

According to one embodiment of the integration method, the data collection component may collect the management information via a Web-Service and/or directly from one or more databases. Each of the computing components may have one or more related configuration or systems management databases. However, the management information may also be collected from a systems management database being used to manage several computing components.

According to one embodiment, the received parameter may be tweaked before searching the full-text search-index data-structure. This way, search words may be adapted before being handed over to the search index and used for a search or query, respectively. Typing errors may be corrected and diverted to other query words or split into a series of synonyms. The tweaking may be freely configurable adding flexibility to a related solution. The related systems behavior may be adapted to different usage scenarios. For example: for a server computing component, a query tweak may change the query "my servers" or "powered-on servers" to checks on management information related to computing component with related, translated, or tweaked attributes interpreting the query accordingly.

According to a further embodiment, the method may also comprise receiving an action associated to one of the displayed matching objects. It may allow a user to act based on the displayed result snippets without opening a related management system and/or interface for one of the computing components. The integration system may interact via a Web-Service with the computing component to perform the action of, e.g., shutting down a server, starting a virtual machine, reconfiguring the computing component, or any other computing component related action.

According to again a further embodiment, the method may also comprise receiving an action associated to several of the displayed matching objects, e.g., to perform a group action. As an example, this may be starting or shutting down a series of virtual machines, or enabling user access to an application for a series of users.

According to an alternative embodiment, the method may also comprise receiving an action independent of the displayed matching objects. This may comprise defining a new, so far not existing, virtual machine on a server or defining an alternative route within a network.

According to yet another embodiment, a systems management application or a computing component, in particular a systems management system or a configuration management component that may be related to a computing component, may be launched, so that a related user interface may be started or launched in context of one or more of the displayed matching objects. This may allow a direct access to systems management functions of observed computing components.

The free text search interface may allow integrating computing components, providing to the normal user all the search and basic execute operations that are required for managing its infrastructure, while still allowing a launch-in-context for—e.g., for a power user—the full functionality of each computing component.

According to an enhanced embodiment, the collecting of management information may be triggered based on a change in the management information. Such a change may be defined as a creation, an update, or a delete of an element or object of a related data structure. This way, the latest computing component information may be available for the integration system. The change may trigger a corresponding action of the crawler.

According to an even more advanced embodiment of the integration method, the displaying the matching objects may be user profile dependent. This may allow showing a specific user only specific data about computing components. This process may be based on a security filter; not all users may have access to all data managed by a specific computing component or access to a specific device or function. E.g., it may only be allowed to a power-user to shut down an air condition system for an entire data center. Each computing component may have defined its own access rules. An extension may collect these rules as part of the crawling process and store them in the full-text search-index data-structure. The filter may be applied when processing the results of a query against the full-text search-index data-structure: before including an entity in a query result, the filter may match the identity of a user performing the search against the rules stored in the full-text search-index data-structure and determine if the user may have access to this computing component and if so, it has to be included in the search results.

According to one embodiment of the integration method, the collection of management information may be based upon a collection profile. With this, a collection priority may be defined. Some computing components may be excluded from a related spider process of the crawler. Alternatively, only specific management information may be collected.

Furthermore, embodiments may take the form of a computer program product, accessible from a computer-usable or computer-readable medium providing program code for use, by or in connection with a computer or any instruction execution system.

For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semiconductor system for a propagation medium. Examples of a computer-readable medium may include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive integration method for managing computing components is given. Afterwards, embodiments of the integration system will be described.

FIG. 1 shows a block diagram of an integration method 100 in accordance with an illustrative embodiment. The integration method 100 for managing computing components—in particular, hardware components, software components, application programs, infrastructure software, middleware, network management components, infrastructure software, database systems, Web-Servers, operating systems, servers of any kind, end user devices, network nodes, cabling systems, cooling systems, facility components, security systems etc.—of a computing infrastructure may comprise collecting, 102, management information about the computing components using a data collection component. The collection component may be implemented in form of a crawler, as a skilled person may know it from Internet search-engines. The collection component may be remote to the computing components. The crawler may be part of the integration system or may be independent from it. However, it may store the collected management information in a storage, assessable for a related integration system. Additionally, the method may comprise storing, 104, objects of the collected management information in a full-text search-index data-structure. There may be one, or a plurality of full-text search-index data-structure. Furthermore, the method may comprise generating, 106, for each collected object a displayable result snippet, and searching, 108, the full-text search-index data-structure for matching objects based on a received parameter. The received parameter or, alternatively several parameters, may be based on a user input. Thus, the parameter may have been received from a user interface. The method may also comprise a retrieving, 110, of matching objects related to the parameter. Alternatively, the retrieving may be part of the displaying.

Thus, the method may comprise displaying, 112, the matching objects in form of the related result snippets. This may be made in a result page using a Web browser. The result page may be preconfigured with empty places for the result snippets. The result snippets may then be placed into the placeholders of the result page for display.

It may be noted that the integration method may be performed independent from the computing components it is collecting management information from. Thus, it may operate independently. Results of the crawler may be displayed and analyzed without an active connection to the systems the management information has been collected from.

The formatting and generating of the result snippets may be performed either during the collecting of the management information or, alternatively, during the displaying. In the first case, the result snippets may be stored within or outside the full-text search-index data-structure. A pointer may be used for addressing.

Figure 2:
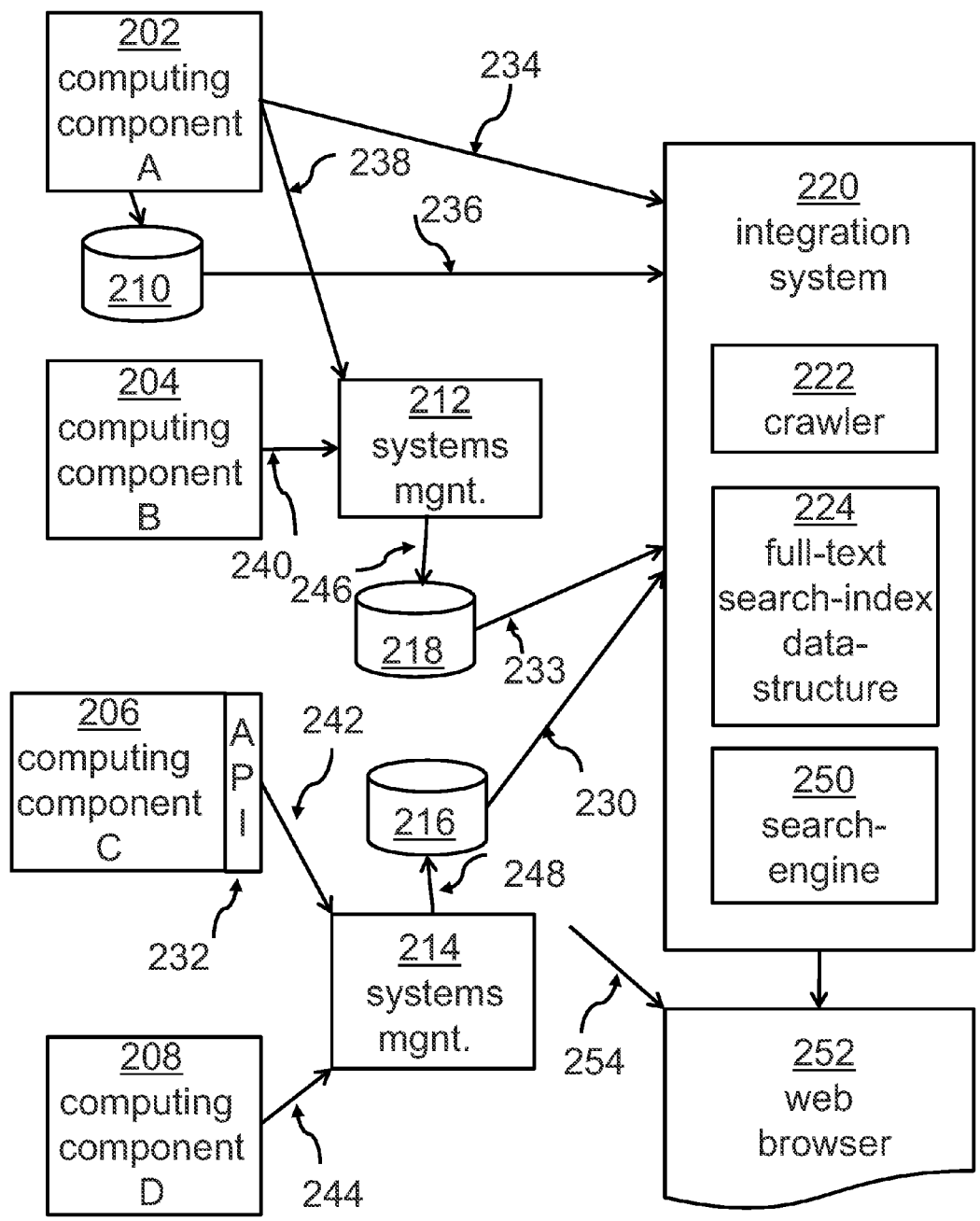
FIG. 2 shows a block diagram of computing components and information collection paths in accordance with an illustrative embodiment.

FIG. 2 shows a block diagram of computing components and information collection paths in accordance with an illustrative embodiment. More particularly, it shows a block diagram of parts of an embodiment of the integration system and related computing components A, B, C, D, with reference numerals 202, 204, 206, 208. These computing components may be any resource in a data center (or even outside) that may be configurable and that may have performance parameters. The configuration and performance parameters may be stored inside the computing components or external to them. In one case of the computing component 202, an external database 210 holding configuration and performance parameters is shown. The configuration and performance parameters—or in general, management information—may be accessible by an API (application programming interface), a Web-Service, a dedicated database or file-system, or the like.

Additionally, systems management systems 212, 214 are shown. They also collect management information about managed computing components. In this example, systems management system 212 manages computing components A, 202 and B, 204 and may store the related management information in a database 218. In a comparable way, systems management system 214 collects management information from computing components C, 206, and D, 208 and may store it in a database 216.

Furthermore, FIG. 2 shows a part of an integration system 220 with some of its components. All arrows directed to the integration system 220 indicate collected management information of the computing components. Also the systems management systems 212, 214, as well as the related databases, may be seen as computing components because they are software applications like any other business software application. The collection of management information of the computing components may be performed by a crawler 222. It may collect the management information from a database 216, 218 of a systems management system 212, 214 via lines 230, 233, directly from a computing component, via line 234, or, via a configuration and performance database 210 of a computing component 202 and connection 236. However, also the systems management systems 212, 214 may have collected management information via lines 238, 240, 242, 244 and may have stored them in databases 216, 218 via lines 246, 248.

The collecting process may be performed by an API 232, shown for example as part of computing component C 206, by a Web-Service, or in any other form.

It may be noted that the crawler 222 may hand over the collected management information of the computing components to a full-text search-index data-structure 224. From here, it may be searched even if a connection to the original systems, i.e., the computing components 202, 204, 206, 208, and also 212, 218, 210, 214, 216 may temporarily not be available to the integration system. Even then, a user may analyze the information in the full-text search-index data-structure 224.

Search engine 250 may search the one or more full-text search-index data-structures 224 based on a user request or user input. This may be an input via a browser or Web-browser 252, wherein also results may be shown. The browser may also have access to the management information of the computing components 202, 204, 206, 208 directly or to the configuration and performance database or to the systems management systems databases 216, 218; compare reference numeral 254. The browser may also be used as user interface for the computing component. This is very comfortable for a user because he may use the interface for all functions without having to change systems.

So, the integration of the computing components may rely, at least, on the following:

Firstly, a collection unit, e.g., in form of a crawler which is responsible for collecting management data from the computing components and storing them in a dedicated full-text search index data-structure. The crawler may directly connect to the computing component database, or may leverage some APIs provided by the computing component, or may read text files managed by the computing component, and so on.

Secondly, a result rendering template: it may be a parameterized HTML snippet that may be used to render, on the search results page, the entities collected by the crawler. While collecting data from the computing components, a dedicated component may be responsible, for each collected object, to replace the parameters inside of the HTML snippet with the collected data, and thus, may generate a pure HTML snippet, that may get stored together with the full-text search-index data. The snippet may also contain links, like, e.g., a link to a systems management application that manages the computing component, to allow performing a launch-in-context of the systems management application.

Thirdly, a set of actions: the actions may appear, together with the HTML snippet, in the result page and allow a user to interact with each entity in the result set, without the need to log into the computing component. Each action may be defined as a single call or a sequence of calls to the computing component, e.g., leveraging APIs it may provide.

These elements may create the simplest type of extension of the integration system, which, however, still may allow integrating a computing component in the free-text search based common management interface. In a reference implementation of this system, it may be possible to define an extension using an XML file that defines the three extension points above and, optionally, bundle it with some Java™ classes that, for example, include the logic for a special purpose crawler.

Figure 3:
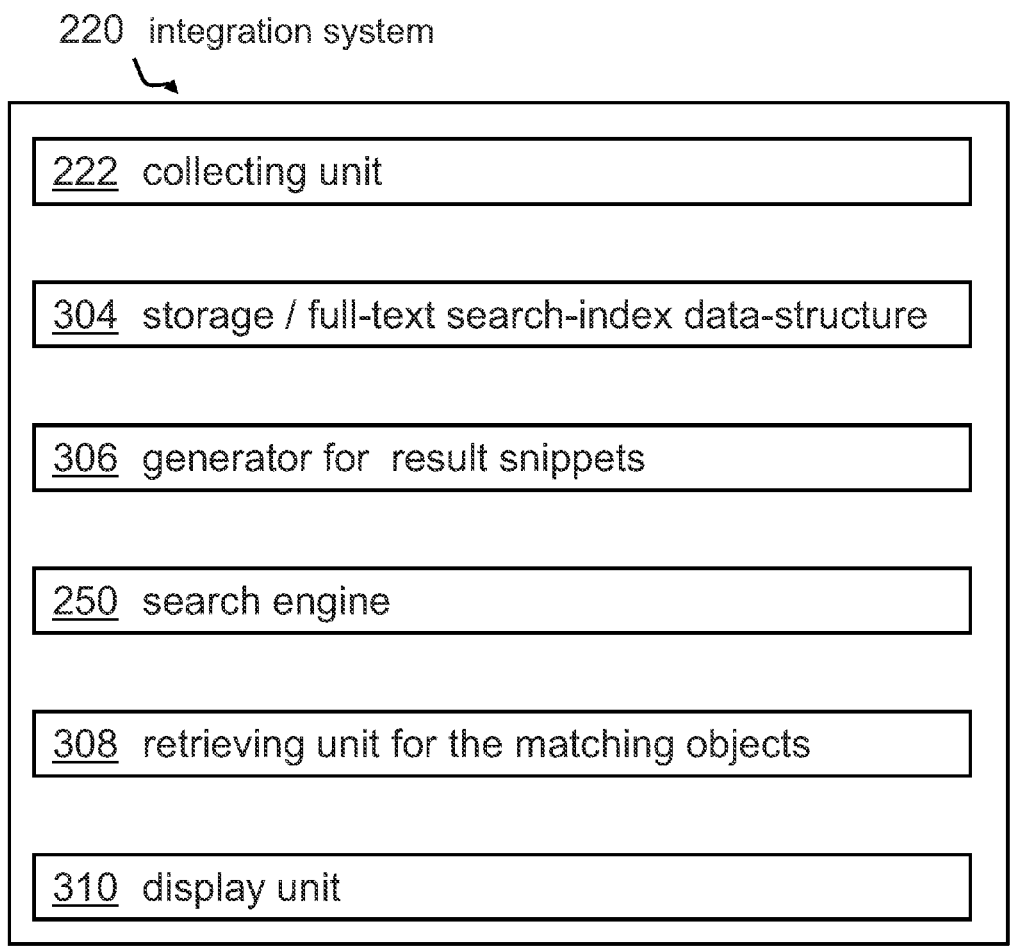
FIG. 3 shows a block diagram of an integration system in accordance with an illustrative embodiment.

FIG. 3 shows a block diagram of an integration system 220 for managing computing components in accordance with an illustrative embodiment. It may comprise a collection unit 222, e.g., a crawler, adapted for collecting management information about the computing components and a storage 304 adapted for storing objects of the collected management information in a full-text search-index data-structure. The integration system may also comprise a generator 306 for generating for each collected object a displayable result snippet that may be stored in the full-text search-index data-structure for further usage. And, there may be a search-engine 250 adapted for searching the full-text search-index data-structure for matching objects based on a received parameter and a retrieving unit 308 adapted for retrieving matching objects. Additionally, the integration system may comprise a display unit 310 adapted for displaying the matching objects in form of the related result snippets. These may be generated during storing them, or at display time.

As mentioned above, the integration system may operate independently from the computing components it is collecting management information from. Only the crawler may be in contact with the computing components for collecting the management information.

Alternatively and optionally, via the mentioned actions, a user may interact with the computing components via a Web browser without making use of any systems management system directly to perform system management or configurations tasks. These actions may be performed individually for specific computing components that may have been displayed on the result page or independent of such displayed computing components as group actions.

Figure 4:
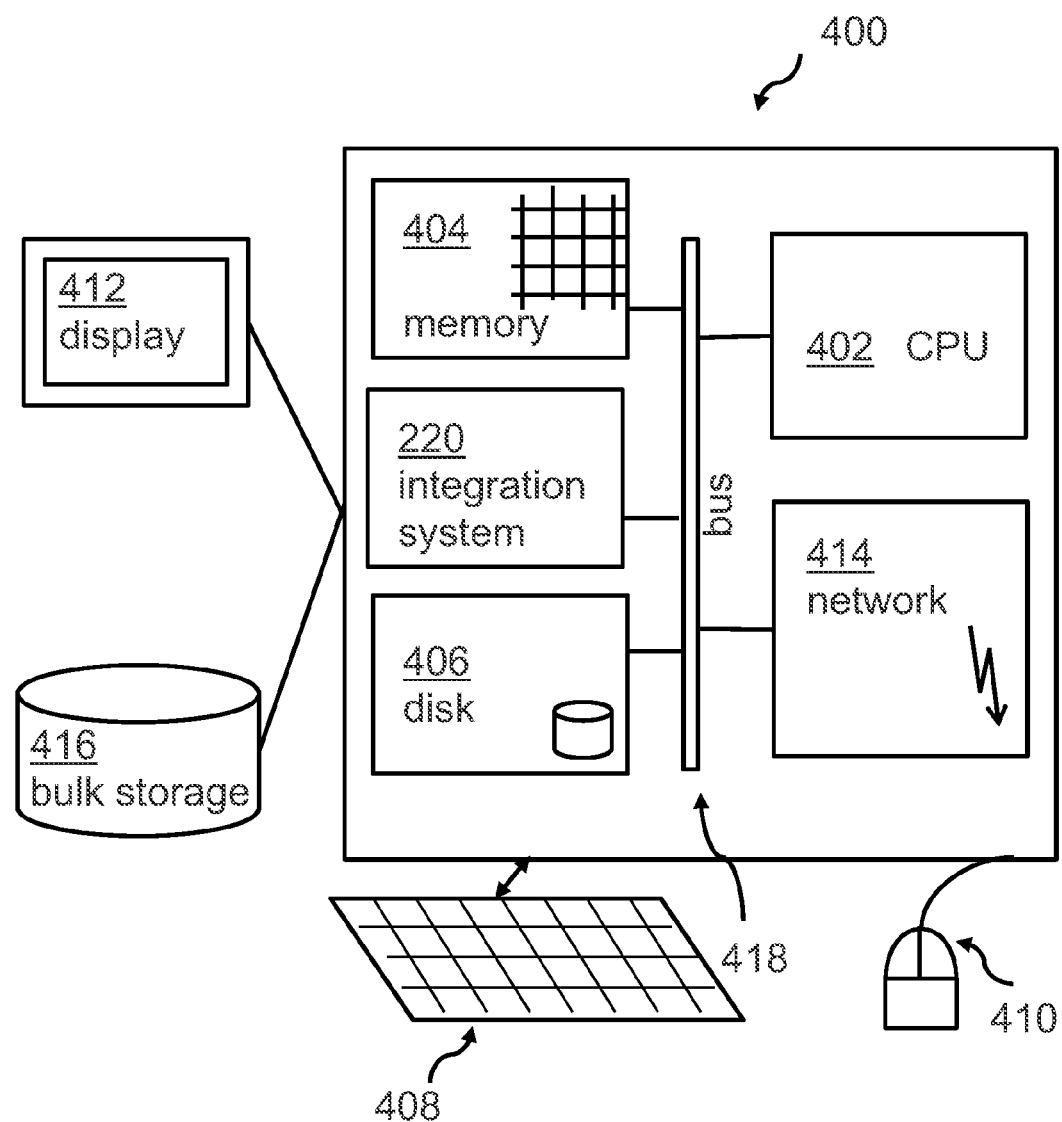
FIG. 4 shows a computer system comprising the integration system in accordance with an illustrative embodiment.

Embodiments of the invention may be implemented together with virtually any type of computer, regardless of the platform being suitable for storing and/or executing program code. For example, as shown in FIG. 4, a computer system 400 may include one or more processor(s) 402 with one or more cores per processor, associated memory elements 404, an internal storage device 406 (e.g., a hard disk, an optical drive such as a compact disk drive or digital video disk (DVD) drive, a flash memory stick, a solid-state disk, etc.), and numerous other elements and functions, typical of today's computers (not shown). The memory elements 404 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 416 for an execution. Elements inside the computer 400 may be linked together by means of a bus system 418 with corresponding adapters. Additionally, the integration system 220 may be attached to the bus system 418.

The computer system 400 may also include input means, such as a keyboard 408, a pointing device such as a mouse 410, or a microphone (not shown). Alternatively, the computer system may be equipped with a touch sensitive screen as main input device. Furthermore, the computer 400 may include output means, such as a monitor or screen 412 (e.g., a liquid crystal display (LCD), a plasma display, a light emitting diode display (LED), or cathode ray tube (CRT) monitor). The computer system 400 may be connected to a network (e.g., a local area network (LAN), a wide area network (WAN), such as the Internet or any other similar type of network, including wireless networks via a network interface connection 414. This may allow a coupling to other computer systems or a storage network or a tape drive. Those skilled in the art will appreciate that many different types of computer systems exist, and the aforementioned input and output means may take other forms. Generally speaking, the computer system 400 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™ Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed herein above may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

The invention claimed is:

1. An integration method for managing computing components, the integration method comprising:
   collecting management information about the computing components using a data collection component;
   storing objects of the collected management information in a full-text search-index data-structure;
   generating for each collected object a displayable result snippet;
   searching the full-text search-index data-structure for matching objects based on a received parameter;
   retrieving all matching objects of full-text search-index data-structure; and
   displaying the matching objects in form of the related result snippets,
   wherein the integration method is performed independently from the computing components it is collecting management information from.

2. The integration method according to claim 1, wherein the data collection component collects the management information via a Web-Service or directly from one or more databases.

3. The integration method according to claim 1, wherein the received parameter is modified before searching the full-text search-index data-structure.

4. The integration method according to claim 1, wherein the method further comprises:
   receiving an action associated to one of the displayed matching objects.

5. The integration method according to claim 1, wherein the method further comprises:
   receiving an action associated to several of the displayed matching objects.

6. The integration method according to claim 1, wherein the method further comprises:
   receiving an action independent of the displayed matching objects.

7. The integration method according to claim 1, wherein the method further comprises:
   launching a systems management application in context of one of the displayed matching objects.

8. The integration method according to claim 1, wherein the collecting of management information is triggered responsive to a change in the management information.

9. The integration method according to claim 1, wherein the displaying the matching objects is user profile dependent.

10. The integration method according to claim 1, wherein the collection of management information is based upon a collection profile.

11. A computer program product, stored on a computer readable storage medium, having a computer readable program stored therein, wherein the computer readable program, when executed on a computing device, causes the computing device to:
    collect management information about the computing components using a data collection component;
    store objects of the collected management information in a full-text search-index data-structure;
    generate for each collected object a displayable result snippet;
    search the full-text search-index data-structure for matching objects based on a received parameter;
    retrieve all matching objects of the full-text search-index data-structure; and
    display the matching objects in form of the related result snippets,
    wherein the integration method is performed independently from the computing components it is collecting management information from.

12. The computer program product according to claim 11, wherein the data collection component collects the management information via a Web-Service or directly from one or more databases.

13. The computer program product according to claim 11, wherein the computer readable program further cause the computing device to:
    receive an action associated to one of the displayed matching objects.

14. The computer program product according to claim 11, wherein the computer readable program further causes the computing device to:
    launch a systems management application in context of one of the displayed matching objects.

15. The computer program product according to claim 11, wherein the collecting of management information is triggered responsive to a change in the management information.

16. An apparatus, comprising:
    a processor; and
    a memory coupled to the processor, wherein the memory comprises instructions which, when executed by the processor, cause the processor to:
    collect management information about the computing components using a data collection component;
    store objects of the collected management information in a full-text search-index data-structure;

generate for each collected object a displayable result snippet;

search the full-text search-index data-structure for matching objects based on a received parameter;

retrieve all matching objects of the full-text search-index data-structure; and display the matching objects in form of the related result snippets, wherein the integration method is performed independently from the computing components it is collecting management information from.

17. The apparatus according to claim 16, wherein the data collection component collects the management information via a Web-Service or directly from one or more databases.

18. The apparatus according to claim 16, wherein the instructions further cause the processor to:

receive an action associated to one of the displayed matching objects.

19. The apparatus according to claim 16, wherein the instructions further cause the processor to:

launch a systems management application in context of one of the displayed matching objects.

20. The apparatus according to claim 16, wherein the collecting of management information is triggered responsive to a change in the management information.

* * * * *